United States Patent
Pokrass et al.

(10) Patent No.: US 10,444,325 B2
(45) Date of Patent: Oct. 15, 2019

(54) METHOD FOR LFM RADAR ACCURACY IMPROVEMENT WITHOUT INCREASING FFT LENGTH

(71) Applicant: GM GLOBAL TECHNOLOGY OPERATIONS LLC, Detroit, MI (US)

(72) Inventors: Alexander Pokrass, Bat Yam (IL); Moshe Laifenfeld, Haifa (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 349 days.

(21) Appl. No.: 15/374,193

(22) Filed: Dec. 9, 2016

(65) Prior Publication Data

US 2018/0164405 A1  Jun. 14, 2018

(51) Int. Cl.
*G01S 13/42* (2006.01)
*G01S 7/35* (2006.01)
*G01S 13/93* (2006.01)
*G01S 7/288* (2006.01)
*G01S 7/292* (2006.01)

(52) U.S. Cl.
CPC ............... *G01S 7/352* (2013.01); *G01S 7/288* (2013.01); *G01S 7/2921* (2013.01); *G01S 7/354* (2013.01); *G01S 13/931* (2013.01); *G01S 2007/2883* (2013.01); *G01S 2007/356* (2013.01)

(58) Field of Classification Search
CPC ........... G01S 13/931; G01S 2007/2883; G01S 2007/356; G01S 7/288; G01S 7/2921; G01S 7/352; G01S 7/354
USPC ............................................................ 342/70
See application file for complete search history.

(56) References Cited

U.S. PATENT DOCUMENTS

2012/0256783 A1*  10/2012  Sego .................... G01S 13/106
                                                           342/146

* cited by examiner

*Primary Examiner* — Timothy A Brainard
(74) *Attorney, Agent, or Firm* — Cantor Colburn LLP

(57) ABSTRACT

A method and apparatus for determining a frequency of an echo signal obtained by a radar system is disclosed. The echo signal in response to a source signal of the radar system is received at a receiver. A harmonic oscillator generates a harmonic component signal, and a multiplier multiplies the echo signal with the harmonic component signal to obtain a combined signal. A Fast Fourier Transform (FFT) is performed on the combined signal to obtain a peak in a frequency space, wherein a central frequency of a frequency bin in the frequency space is shifted with respect to the frequency of the echo signal by the harmonic component signal. The frequency of the echo signal is determined from the shifted central frequency.

16 Claims, 4 Drawing Sheets

METHOD FOR LFM RADAR ACCURACY IMPROVEMENT WITHOUT INCREASING FFT LENGTH

FIELD OF THE INVENTION

The subject invention relates to collision avoidance systems for vehicles and, in particular, to a method of increasing an accuracy of frequency measurements in radar systems used in collision avoidance systems.

BACKGROUND

Recent automobiles and vehicles have been built with on-board safety systems which include radar technologies for detecting a location of an object or target with respect to the vehicle so that a driver or collision-avoidance device can react accordingly. A radar system includes a transmitter for sending out a source signal and a receiver for receiving an echo or reflection of the source signal from the target. The received signal is sampled at a selected sampling frequency and the sampled data points of the received signal are entered into a Fast Fourier Transform (FFT) in order to determine a frequency of the returning signal. A range or relative velocity of the target with respect to the vehicle can be determined from this frequency.

The frequency resolution in such radar systems is limited due to the discrete nature of the FFT. Such frequency resolution is a function of a sampling frequency and a number of samples of the received signal. One way to increase accuracy is to take more samples. This however increases the length of the FFT, which increase the number of computations need to perform the FFT, often requiring a prohibitively large number of computations. Additionally, the FFT often produces frequency sidelobes which are considered aberrations. Increasing the length of the FFT without increasing the sample frequency creates higher sidelobes, leading to higher noise levels. Thus, any improvement in accuracy that results from increasing FFT length comes with a corresponding reduction in signal quality. Accordingly, it is desirable to provide a method for improving radar accuracy without increasing a length of FFTs.

SUMMARY OF THE INVENTION

In an exemplary embodiment of the invention, a method of determining a frequency of an echo signal obtained by a radar system includes: receiving the echo signal at a receiver in response to a source signal of the radar system; multiplying the echo signal by a harmonic component signal to obtain a combined signal; performing, on a processor, a Fast Fourier Transform (FFT) on the combined signal to obtain a peak in a frequency space, wherein a central frequency of a frequency bin in the frequency space is shifted with respect to the frequency of the echo signal by the harmonic component signal; and determining the frequency of the echo signal from the shifted central frequency.

In another exemplary embodiment of the invention, an apparatus for determining a frequency of an echo signal obtained using radar includes: a receiver configured to receive the echo signal in response to reflection of a source signal generated by the radar from a target; a harmonic oscillator configured to generate a harmonic component signal; a multiplier for multiplying the echo signal with the harmonic component signal to obtain a combined signal; and a processor configured to: perform a Fast Fourier Transform (FFT) on the combined signal to obtain a peak in a frequency space, wherein a central frequency of a frequency bin in the frequency space is shifted with respect to the frequency of the echo signal, and determine the frequency of the echo signal from the shifted central peak.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
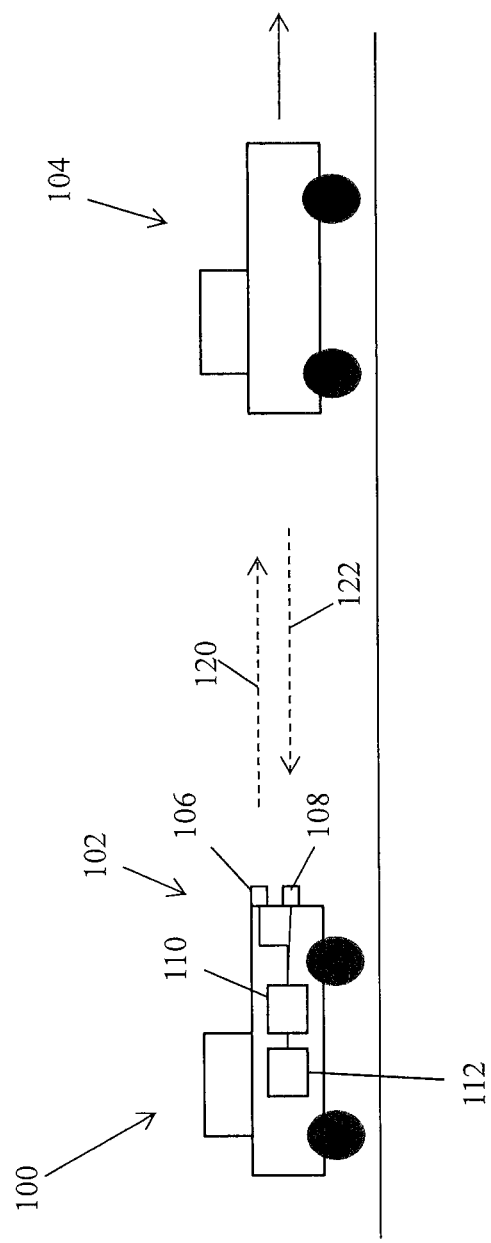
FIG. 1 shows a vehicle that includes a radar system suitable for determining a distance and/or a relative velocity of an object or target with respect to the vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 shows a vehicle 100, such as an automobile, that includes a radar system 102 suitable for determining a distance and/or a relative velocity of an object or target 104 with respect to the vehicle 100. In the embodiment shown in FIG. 1, the radar system 102 includes a transmitter 106 and a receiver 108. In alternate embodiments, the radar system 102 may be a MIMO (multi-input, multi-output) radar system that includes an array of transmitters and an array of receivers. A control unit 110 on-board the vehicle 100 controls and operates the transmitter 106 to generate a radio frequency wave (a "source signal" 120). In an embodiment, the source signal 120 includes a linear frequency-modulated continuous wave (LFM-CW), often referred to as a chirp signal. Alternately, the source signal 120 can be a pulsed signal or a combination of pulsed and chirp signals. A reflection of the source signal 120 from the target 104 is referred to herein as an echo signal 122. The echo signal 122 is received at the receiver 108, which generally includes circuitry for sampling the echo signal 122. The control unit 110 performs calculations on the echo signal 122 in order to determine distance and/or a relative velocity of the target 104 with respect to the vehicle 100. Knowledge of the distance and/or relative velocity of the target 104 with respect to the vehicle 100 can then be used to maneuver the vehicle 100 by, for example, accelerating or decelerating the vehicle 100 or steering the vehicle in order to avoid the target 104. In an embodiment, the control unit 110 determines distance and/or velocity of the target 104 and may cooperate with a collision-avoidance system 112 to control steering and acceleration/deceleration components to perform necessary maneuvers at the vehicle 100 to avoid the target 104. In another embodiment, the control unit 110 provides a signal to alert a driver of the vehicle 100 so that the driver can take any necessary action to avoid the target 104.

While the radar system 102 is discussed herein as being on-board vehicle 100, the radar system 102 may also be part of an immobile or stationary object in alternate embodiments. Similarly, the target 104 can be a vehicle or moving object or can be an immobile or stationary object.

Figure 2:
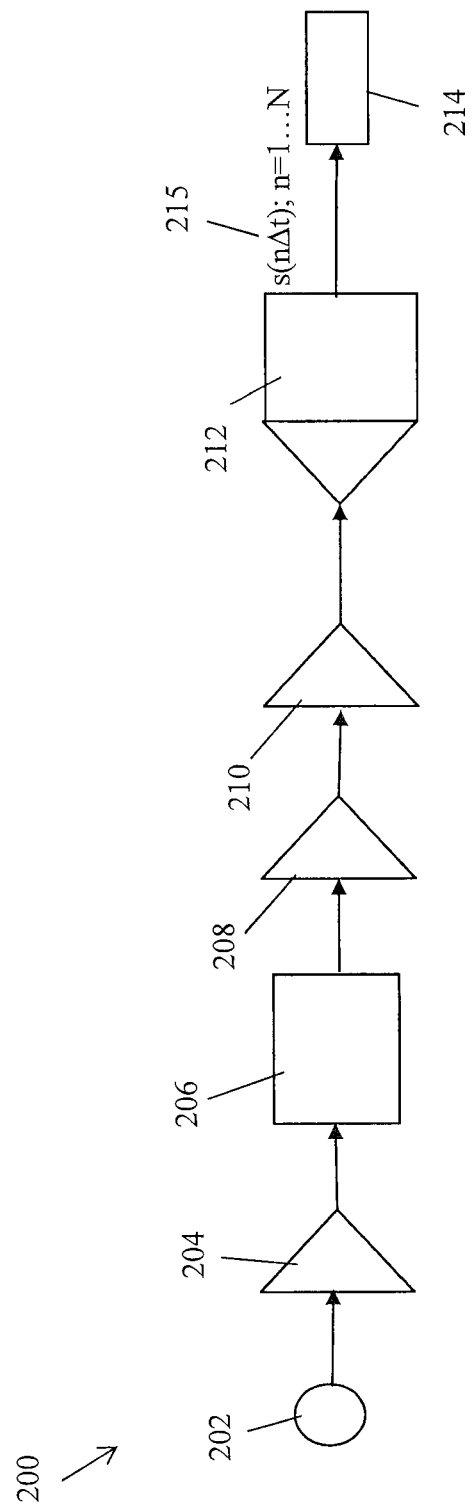
FIG. 2 shows an exemplary front end of a receiver system for the exemplary radar system of FIG. 1.

FIG. 2 shows an exemplary front end 200 of a receiver system for the exemplary radar system of FIG. 1. The front end 200 includes a receiver antenna 202 that receives the echo signal 122 of FIG. 1. An electrical signal generated by the echo signal 122 is sent from the receiver antenna 202 through a low noise amplifier 204 that amplifies signals without significantly degrading a signal-to-noise ratio (SNR). The amplified signal is sent to a mixer 206. The mixer 206 combines both in-phase and quadrature components of the echo signal 122. The combined signal undergoes filtering via a high-pass filter 208 and a low-pass filter 210. Analog-to-digital converter (ADC) 212 converts the filtered signal to a digital signal 215 by sampling the filtered signal at a selected sampling frequency, $f_s$. The digital signal 215 is provided to a digital signal processor (DSP) 214, which performs the various methods disclosed below for determining a distance and/or velocity of a target. The DSP 214 generates a discrete frequency spectrum of the digital signal s(n$\Delta$t) 215. In an embodiment, the DSP 214 performs a Fast Fourier Transform (FFT) on the digital signal 215 to obtain the discrete frequency spectrum. Peaks within the frequency spectrum are representative of the echo signal and are used to determine location and/or velocity of the target 104. Other transforms besides FFT can be used in alternate embodiments.

The FFT performed on the digital signal 215 produces a discrete frequency space which includes multiple frequency bins for representing a frequency component of the digital signal 215. The length of the FFT is related to the number of samples. Therefore, N samples of the echo signal at the ADC 212 indicates an FFT of length N. The resultant frequency space has N frequency bins, each characterized by a central frequency. A bin resolution $\Delta F$ of the frequency space provided by the FFT is therefore given by $\Delta F = f_s/N$, where $f_s$ is the sampling rate.

The ability of the collision avoidance system 112 or of the driver to avoid the target 104 is related to an accuracy with which one knows the location and/or velocity of the target 104 relative the radar system 102 or vehicle 100. This distance and/or velocity resolution is related to frequency resolution of the echo signal 122. The frequency resolution has previously been limited by sampling rate and sample size or FFT length of the radar system. The method described herein improves the frequency resolution without changing the length of the FFT.

Figure 3:
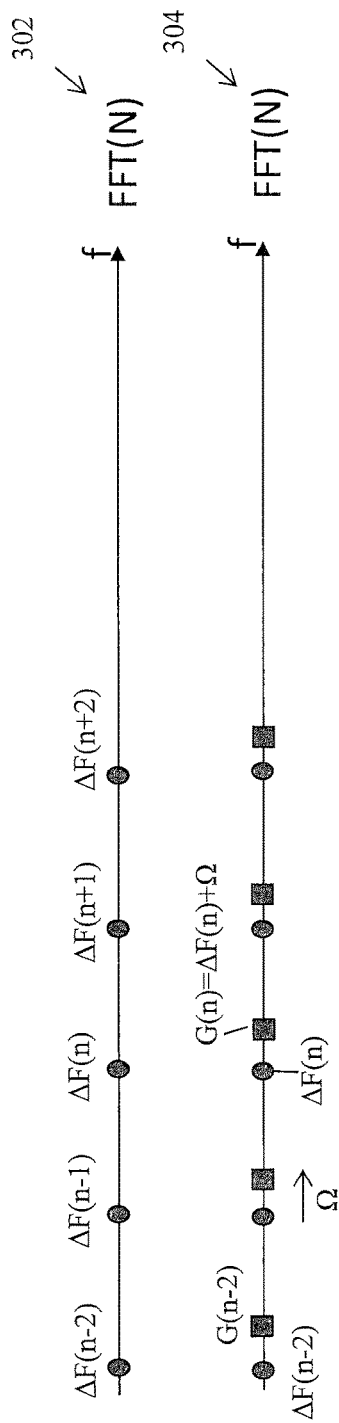
FIG. 3 shows two frequency spaces illustrating frequency resolution difficulties that occur when performing a Fast Fourier Transform (FFT) on a signal whose frequency does not correspond to a sampling frequency.

FIG. 3 shows two frequency spaces illustrating frequency resolution difficulties that occur when performing an FFT on a signal whose frequency does not correspond to the sampling frequency. The first frequency space 302 shows, via circles, the locations of central frequencies of illustrative frequency bins {$\Delta F(n-2)$, $\Delta F(n-1)$, $\Delta F(n)$, $\Delta F(n+1)$, $\Delta F(n+2)$}. A frequency signal that falls within a selected range of the central frequency of a selected frequency bin is indicated in frequency space 302 by a peak at the central frequency. When a frequency of a sampled signal falls exactly at the center of the frequency bin, then the frequency space accurately represents the frequency of the sampled signal. However, this is not usually the case.

The second frequency space 304 shows, via squares, how sampled signal frequencies are more likely to be located with respect to the frequency bins {$\Delta F(n-2)$, $\Delta F(n-1)$, $\Delta F(n)$, $\Delta F(n+1)$, $\Delta F(n+2)$}. Rather than producing peaks at a central frequency of the frequency bins, the frequency peaks of the actual echo signal are located at squares. The difference between the location of the frequency peak of the actual echo signal and the central frequency of the frequency bins is represented by frequency $\Omega$. Due to the nature of the discrete frequency space, the FFT returns a frequency $\Delta F(n)$ for the echo signal which is different than the actual frequency $G(n)$ of the echo signal, where $G(n) = \Delta F(n) + \Omega$.

Figure 4:
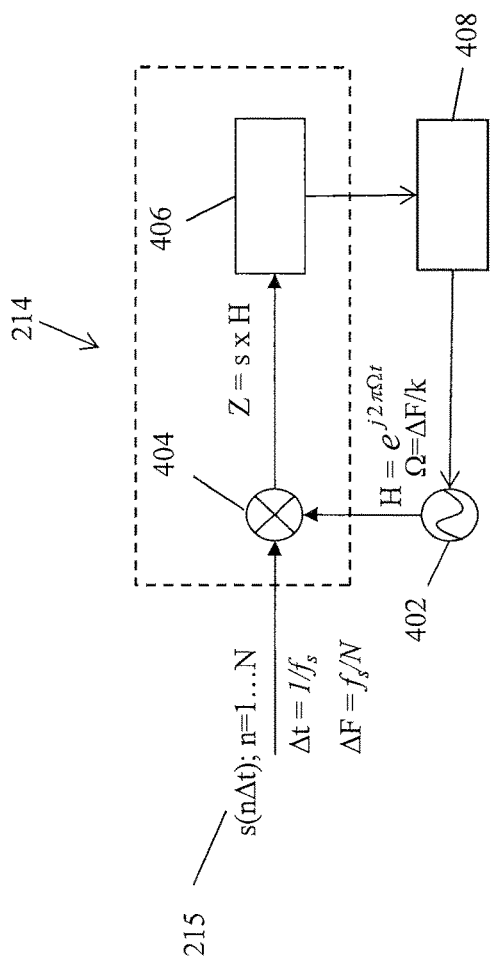
FIG. 4 schematically illustrates a method in accordance with the invention for increasing a resolution of the FFT spectrum by shifting a frequency bin.

FIG. 4 schematically illustrates a method in accordance with the invention for increasing a resolution of the FFT spectrum by shifting a frequency bin. Digital signal 215 is received at the DSP 214. The digital signal 215 is produced in FIG. 2 at the ADC 212 by sampling the analog echo signal at sampling rate $f_s$. The digital signal 215 is represented in FIG. 4 as s(n$\Delta$t) in which time interval $\Delta t$ represents a sampling interval of the signal and index n=1 . . . N is a sampling index. The length of the time interval $\Delta t$ is related to the sampling frequency ($f_s$) by the equation $\Delta t = 1/f_s$.

A harmonic signal generator 402 provides a harmonic signal component H to the DSP 214. The harmonic signal component H is multiplied with the signal s(n$\Delta$t) at multiplier 404 to obtain combined signal Z and the combined signal Z is provided to FFT 406. The harmonic signal component is a complex harmonic signal that has a selected frequency that is related resolution of the FFT 406. In an embodiment, the harmonic signal component H is a sinusoidal signal H=exp(j2$\pi\Omega$t), where $\Omega$ is a frequency component given by $\Omega = \Delta F/k$, wherein $\Delta F$ is the frequency resolution of the FFT and k is an arbitrary resolution factor. Multiplying the signal s(n$\Delta$t) by the harmonic signal component H and performing the FFT allows one to adaptively shift the resulting frequency bins to coincide with the peaks of the digital signal s(n$\Delta$t) within a selected resolution criterion. A frequency tuner 408 can adaptively adjust K at the harmonic signal generator 402 based on the results of the FFT 406 in order to provide a frequency $\Omega$ which aligns a central frequency of a frequency bin with the actual frequency of the echo signal to within the selected criterion. The frequency tuner 408 can select a frequency k (and thereby $\Omega$) in order to shift the central frequency toward the actual frequency. The resolution factor k can be selected to improve the resolution of the echo signal by factors of 2, 4, etc., or to within any other resolution threshold. By doing so, the frequency resolution is increased without increasing the length of the FFT (i.e., without increasing a number of samples). The results of multiplying s(n$\Delta$t) by the harmonic component H are demonstrated herein with respect to FIG. 5.

Figure 5:
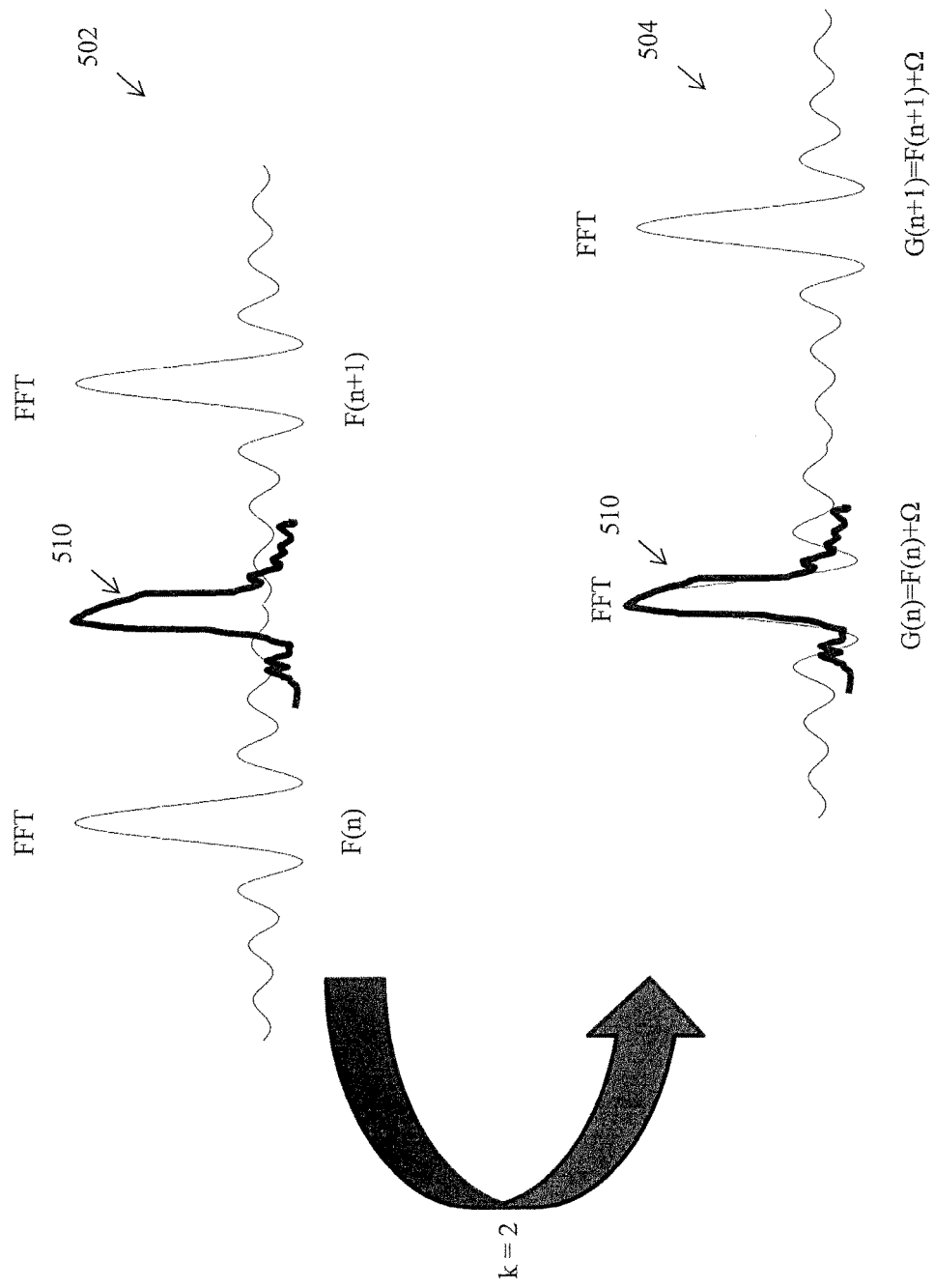
FIG. 5 illustrates the shifting of the frequency bins to coincide with an actual echo frequency in accordance with an embodiment of the invention.

FIG. 5 illustrates the shifting of the frequency bins to coincide with an actual echo frequency 510 in accordance with an embodiment of the invention. In frequency space 502, the actual echo frequency 510 is superimposed against frequency bins $\Delta F(n)$ and $\Delta F(n+1)$. It is clear that the actual echo frequency 510 lies somewhere between the central frequency of the first frequency bin $\Delta F(n)$ and the central frequency of the second frequency bin $\Delta F(n+1)$, and thus the actual echo frequency 510 is not fully represented by either of bins $\Delta F(n)$ or $\Delta F(n+1)$.

Frequency space 504 shows the results of multiplying the echo signal s(n$\Delta$t) by the harmonic signal component H=exp ($j2\pi\Omega t$), in which $\Omega=\Delta F/k$ and $k=2$ to obtain combined signal Z and performing the FFT on the combined signal Z. As a result, the central frequencies of the bins $\Delta F(n)$ and $\Delta F(n+1)$ have been shifted by an amount $\Omega$ to $G(n)=\Delta F(n)+\Omega$ and $G(n+1)=\Delta F(n+1)+\Omega$. The central frequencies of the new frequency bins $G(n)$ and $G(n+1)$ better coincide with the actual echo frequency 510 of echo signal $s(n\Delta t)$ and thus provide a more accurate reading of the echo signal.

It is to be noted that the method disclosed herein provides an improvement in frequency resolution and thus an improvement in distance and/or velocity measurements. This improvement is obtained without increasing the length of the FFT and thus without an increase in computational complexity or computation time. By increasing accuracy while not increasing computation time, the distance or velocity of the target 104 can be provided to the driver or collision avoidance system in less time than when using methods which require increasing the length of the FFTs. The driver or collision avoidance system then has more time to react to avoid the target, thus increasing a safety of the driver and vehicle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of determining a frequency of an echo signal obtained by a radar system, comprising:
   receiving the echo signal at a receiver in response to a source signal of the radar system;
   multiplying the echo signal by a harmonic component signal to obtain a combined signal; and
   performing, on a processor, a Fast Fourier Transform (FFT) on the combined signal to obtain a peak in a frequency space, wherein a central frequency of a frequency bin in the frequency space is shifted with respect to the frequency of the echo signal by the harmonic component signal; and
   determining the frequency of the echo signal from the shifted central frequency.

2. The method of claim 1, wherein the harmonic component signal is a complex harmonic signal.

3. The method of claim 2, wherein a frequency $\Omega$ of the complex harmonic signal is equal to a fraction of a frequency resolution of the FFT.

4. The method of claim 3, wherein $\Omega=\Delta F/k$, where $\Delta F$ is a frequency resolution of the frequency space for the FFT and k is a resolution factor.

5. The method of claim 3, wherein the central frequency of the frequency bin is shifted in frequency space by the frequency $\Omega$.

6. The method of claim 3, further comprising adjusting the harmonic frequency $\Omega$ based on a result of the FFT.

7. The method of claim 1, further comprising providing the frequency measurement to a collision avoidance device of a vehicle.

8. The method of claim 7, wherein the determined frequency indicates at least one of a location and a velocity of a target with respect to the vehicle, further comprising operating the collision avoidance device to maneuver the vehicle with respect to the target based on the determined frequency.

9. An apparatus for determining a frequency of an echo signal obtained using radar, comprising:
   a receiver configured to receive the echo signal in response to reflection of a source signal generated by the radar from a target;
   a harmonic oscillator configured to generate a harmonic component signal;
   a multiplier for multiplying the echo signal with the harmonic component signal to obtain a combined signal; and
   a processor configured to:
      perform a Fast Fourier Transform (FFT) on the combined signal to obtain a peak in a frequency space, wherein a central frequency of a frequency bin in the frequency space is shifted with respect to the frequency of the echo signal, and
      determine the frequency of the echo signal from the shifted central peak.

10. The apparatus of claim 9, wherein the harmonic component signal is a complex harmonic signal.

11. The apparatus of claim 10, wherein a frequency $\Omega$ of the complex harmonic signal is equal to a fraction of a frequency resolution of the FFT.

12. The apparatus of claim 11, wherein $\Omega=\Delta F/k$, where $\Delta F$ is a frequency resolution of the frequency space for a selected FFT and k is a resolution factor.

13. The apparatus of claim 11, wherein the central frequency of the frequency bin is shifted in frequency space by frequency $\Omega$.

14. The apparatus of claim 11, further comprising a frequency tuner that adjusts the harmonic frequency $\Omega$ of the harmonic oscillator based on a result of the FFT.

15. The apparatus of claim 9, further comprising a vehicle including a collision avoidance device that operates using the frequency measurement.

16. The apparatus of claim 15, wherein the determined frequency indicates at least one of a location and a velocity of a target with respect to the vehicle, and the collision avoidance device maneuvers the vehicle with respect to the target based on the determined frequency.

* * * * *